E. F. BROWN.
VEHICLE ROAD TRACK.
APPLICATION FILED DEC. 21, 1916.
1,225,008.
Patented May 8, 1917.
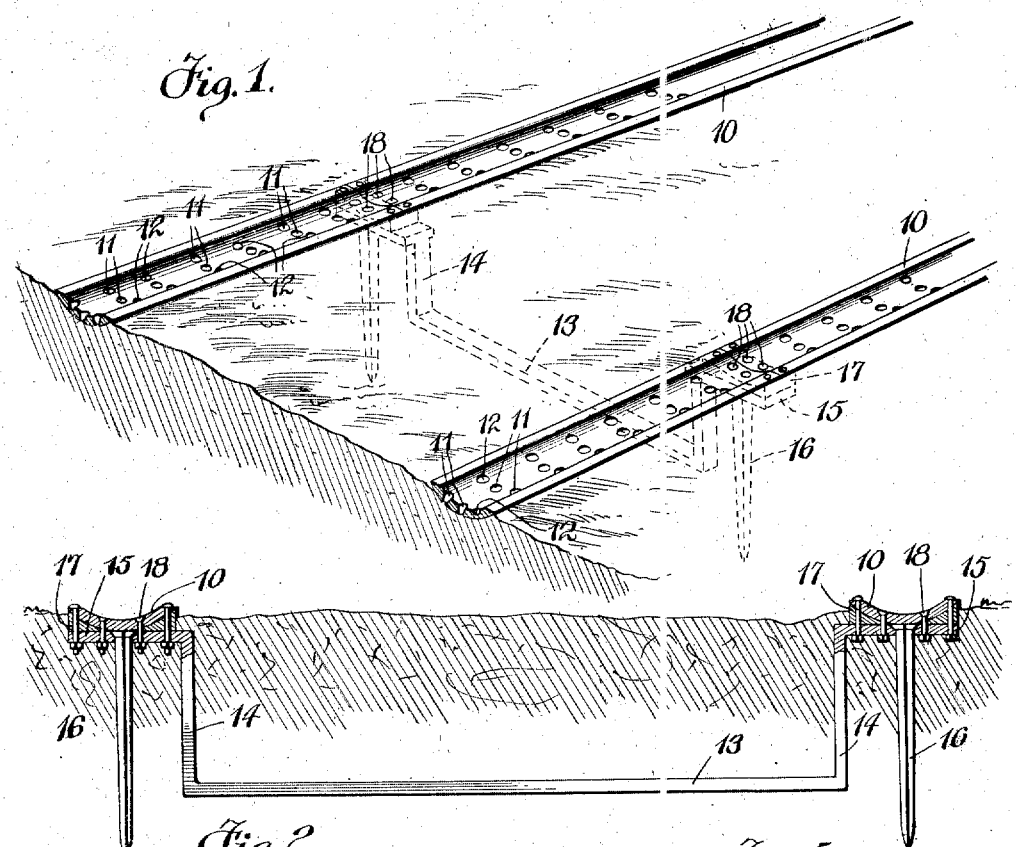
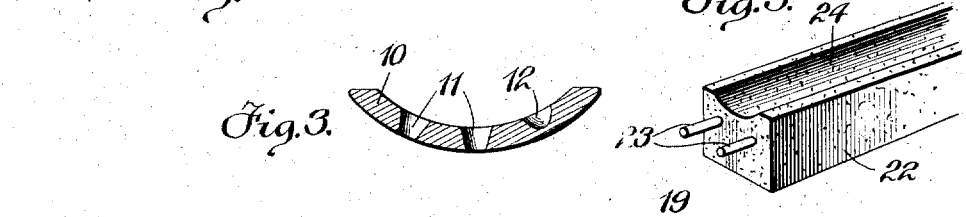
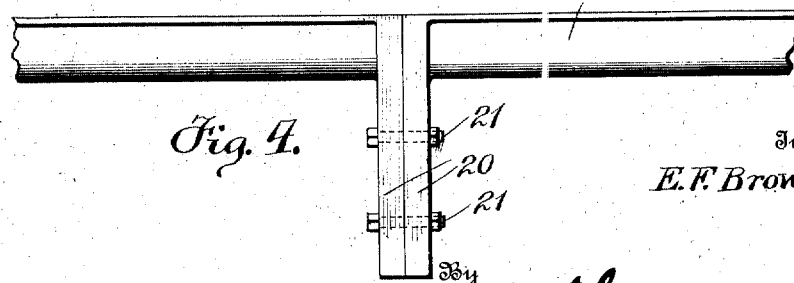
Inventor
E. F. Brown.
By
Attorneys.

UNITED STATES PATENT OFFICE.

ERIC F. BROWN, OF BUXTON, IOWA.

VEHICLE ROAD-TRACK.

1,225,008.  Specification of Letters Patent.  Patented May 8, 1917.

Application filed December 21, 1916. Serial No. 138,232.

*To all whom it may concern:*

Be it known that I, ERIC F. BROWN, a citizen of the United States, residing at Buxton, in the county of Monroe and State of Iowa, have invented certain new and useful Improvements in Vehicle Road-Tracks, of which the following is a specification.

This invention relates to an improved road track for vehicles and has as its primary object to provide a track which may be erected upon a vehicle roadway to accommodate the traffic thereover, thus dispensing with the necessity for surfacing the road and eliminating the consequent expense incident thereto.

The invention has as a further object to provide a track of the above described character having rails and wherein the said rails will be connected and supported by cross ties embedded in the roadway and secured by anchoring stakes.

And the invention has as a still further object to so form the said rails that a vehicle may easily follow the track and wherein the said rails will be provided with suction cups adapted for coöperation with the tires of the vehicle to prevent slipping of the vehicle tires and wherein the said rails will also be provided with drain openings therefor.

Other and incidental objects will appear as the description proceeds and in the drawings, wherein I have illustrated the preferred embodiment of the invention and wherein similar reference characters designate corresponding parts throughout the several views:

Figure 1 is a fragmentary perspective view showing a portion of my improved track and illustrating the preferred arrangement of drain openings and vacuum cups in the track rails, Fig. 2 is a sectional view more particularly showing one of the cross ties for connecting and supporting the rails of the track as well as the manner in which the track rails are secured to the said tie, Fig. 3 is a detail sectional view showing the particular type of drain openings preferably employed in the track rails as well as the type of vacuum cup formed in the said rails to coöperate with the tires of a vehicle, Fig. 4 is a fragmentary side elevation showing a slightly modified form of rail, and Fig. 5 is a fragmentary perspective view showing a still further modified form of rail construction.

In carrying out the invention, my improved road track is formed with coacting rails 10 arranged a suitable distance apart in substantially parallel relation for receiving a vehicle of the ordinary gage. The rails 10 may be constructed of metal, wood or other suitable material and are each formed of a plurality of sections of approved length. As particularly shown in Fig. 3, the said rails are channel shaped or substantially concavo-convex in cross-section with the concave sides thereof presented upwardly to provide ruts for receiving the wheels of a vehicle. In thus forming the rail sections, the vehicle may easily follow the track.

Formed in the sections of the rails at suitable longitudinally spaced points, are transversely arranged series of drain openings 11, and a suction cup or pocket 12 arranged in alinement with the said openings of each series. The drain openings 11 are, as particularly shown in Fig. 3, preferably of conical formation with the smaller ends thereof presented downwardly and it will be noted upon reference to Fig. 1, that the cups 12 are preferably alternately arranged at opposite ends of the series of openings 11 or adjacent opposite sides of the rails 10. At this point, it may be desirable to state that the rails are preferably formed of suitable metal and it will be noted that the openings 11 are adapted to effectually drain the rails. The cups 12 are designed to coöperate with the tires of a vehicle for creating a partial vacuum at the several points of contact of the tires with the rails to consequently increase the traction of the tires and prevent slipping. In this connection, attention is directed to the fact that since the smaller ends of the drain openings 11 are presented downwardly, the vehicle tires in passing over the said openings, will tend to jam air within the said openings so that these openings will then, in effect, provide air pockets coöperating with the vehicle tires to further increase the traction of the vehicle.

Arranged to support the rails 10 at the meeting ends thereof are connecting or cross ties 13. These ties each include a body sunk into the roadway upon which the track is to be mounted and provided at its extremities with upstanding legs 14 having laterally projecting arms 15 extending outwardly in opposite directions from the upper extremities thereof. These arms are, as shown in dotted lines in Fig. 1, slightly enlarged and are disposed immediately beneath the surface of the roadway to support the rails projecting slightly above the road surface. Driven through the arms 15 into the roadbed are anchoring stakes 16 for the ties adapted to securely hold the said ties in operative position.

It will now be observed that the meeting ends of the rail sections are rested upon the arms 15 of the ties and fitted beneath the outer sides of the said rail sections at the joints therebetween, are wedge blocks 17 designed to hold the rail sections from tilting. Connecting the rail sections with the said arms is a plurality of bolts or other suitable fastening devices 18 which are fitted through the ends of the rail sections and through the blocks 17 to engage the arms 15 for securely holding the rails in position upon the ties and maintaining the blocks 17 against displacement.

From the preceding description, it will be seen that I thus provide a vehicle track which may be readily erected upon a roadway so that vehicles may travel upon the track to consequently dispense with the necessity for surfacing the road and while I have indicated that the cross ties 13 are employed only at the joints between the rail sections, still, it will be understood that any approved number of ties may be used and arranged at suitably spaced points longitudinally of the track. Furthermore, the track rails are of such construction that a vehicle may easily follow the track while, at the same time, any tendency of the vehicle wheels to slip is reduced to a minimum through the provision of the drain openings and vacuum cups in the rails.

In Fig. 4 of the drawings, I have illustrated a slight modification of the invention wherein the cross ties 13 are eliminated. In this modification, the rail sections 19 are formed at their extremities with laterally directed mating terminals 20 adapted to be secured together by a plurality of bolts or other suitable fastening devices 21 with the said terminals forming an anchoring stake or arm designed to be driven into the ground for supporting the rail sections in active position. This construction provides a very simple arrangement for mounting the track rails which, in some instances, may be found desirable. Since the rail sections 19 are otherwise formed in accordance with the rail sections of the preferred form of the invention a further description thereof is deemed unnecessary.

In Fig. 5 of the drawings, I have illustrated a still further modification of the invention which relates more particularly to the construction of rail employed. In this modification, the track rails are each formed of a plurality of cement blocks 22. The said blocks may be of any approved length and are arranged end to end. Connected to one end of each of the blocks are locking pins 23 arranged for engagement in the meeting terminal of the next adjacent block for rigidly connecting the several blocks of the rail. The blocks 22, upon the upper side thereof, are formed with concave channels 24 to receive the wheels of a vehicle, these channels providing ruts for the vehicle wheels so that the vehicle may easily follow the track.

Having thus described my invention, what I claim and desire to secure by Letters Patent is:

1. A vehicle track for highway traffic including coacting rails for receiving the wheels of a vehicle, cross ties connecting the rails, and anchoring stakes for the said ties arranged with the rails overlying the upper extremities of said stakes for holding the stakes against upward displacement.

2. A road track for vehicles including coacting rails formed to receive the wheels of a vehicle and provided with cupped tread surfaces.

3. A vehicle track for highway traffic including coacting rails for receiving the wheels of a vehicle, cross ties having the rails seated thereon, blocks mounted upon the ties and engaging beneath opposite margins of the rails for holding the rails against tilting with respect to the ties, and means connecting the rails with the ties and engaging said blocks with the said means adjustable for clamping the blocks in position.

4. A vehicle track for highway traffic including coacting concavo-convex rails arranged with the concave sides of the rails presented upwardly to form ruts for the wheels of a vehicle, cross ties having the rails seated thereon with the blocks fitting the convex sides of the rails and engaging beneath opposite margins of the said rails and the ties for holding the rails against tilting with respect to the ties, and means connecting the rails with the ties.

5. A road track for vehicles including coacting rails formed to receive the wheels of the vehicle and provided with longitudinally tapered drain openings, the said drain openings being arranged with the smaller ends thereof presented downwardly and being adapted to provide air pockets in the tread surfaces of the rails.

6. A road track for vehicles including coacting rails formed to receive the wheels of a vehicle and each provided at longitudinally spaced points upon the tread surface thereof with transversely arranged series of drain openings and with a tread cup arranged in alinement with each series, the cups of successive series of each of the rails being alternately arranged at opposite margins of the said tread surfaces.

In testimony whereof I affix my signature.

ERIC F. BROWN. [L. S.]